United States Patent [19]

Vollman

[11] Patent Number: 5,075,072
[45] Date of Patent: Dec. 24, 1991

[54] HIGH TEMPERATURE CONTROL ROD ASSEMBLY

[75] Inventor: Russell E. Vollman, Solana Beach, Calif.

[73] Assignee: General Atomic, San Diego, Calif.

[21] Appl. No.: 419,683

[22] Filed: Oct. 11, 1989

[51] Int. Cl.[5] .............................................. G21C 7/10
[52] U.S. Cl. ................................... 376/335; 376/227; 376/433
[58] Field of Search ............... 376/333, 335, 433, 327, 376/332, 226, 207

[56] References Cited

U.S. PATENT DOCUMENTS

| | | | |
|---|---|---|---|
| 2,852,458 | 9/1958 | Dietrich et al. | 376/327 |
| 3,121,045 | 2/1964 | Harris et al. | 376/327 |
| 3,227,623 | 1/1966 | White | 376/433 |
| 3,287,230 | 11/1966 | Jerkins et al. | 376/433 |
| 3,932,215 | 1/1976 | Kruger | 376/335 |
| 3,945,886 | 3/1976 | Derevyanklin et al. | 376/335 |
| 4,001,078 | 1/1977 | Doll | 376/335 |
| 4,452,754 | 6/1984 | Groh et al. | 376/335 |
| 4,490,201 | 12/1984 | Leeds | 156/155 |
| 4,838,346 | 6/1989 | Camarda et al. | 244/117 A |

FOREIGN PATENT DOCUMENTS

| | | | |
|---|---|---|---|
| 2925861 | 1/1981 | Fed. Rep. of Germany | 376/332 |
| 2925863 | 1/1981 | Fed. Rep. of Germany | 376/335 |
| 1420588 | 11/1965 | France | 376/335 |
| 3030782 | 2/1988 | Japan | 376/335 |
| 798466 | 7/1958 | United Kingdom | 376/335 |
| 1039204 | 8/1966 | United Kingdom | 376/433 |

OTHER PUBLICATIONS

Nuclear Eng. Int., Jan. 1988, pp. 16, 18, 19.

Primary Examiner—Harvey E. Behrend
Attorney, Agent, or Firm—Nydegger & Associates

[57] ABSTRACT

A high temperature nuclear control rod assembly comprises a plurality of substantially cylindrical segments flexibly joined together in succession by ball joints. The segments are made of a high temperature graphite or carbon-carbon composite. The segment includes a hollow cylindrical sleeve which has an opening for receiving neutron-absorbing material in the form of pellets or compacted rings. The sleeve has a threaded sleeve bore and outer threaded surface. A cylindrical support post has a threaded shaft at one end which is threadably engaged with the sleeve bore to rigidly couple the support post to the sleeve. The other end of the post is formed with a ball portion. A hollow cylindrical collar has an inner threaded surface engageable with the outer threaded surface of the sleeve to rigidly couple the collar to the sleeve. the collar also has a socket portion which cooperates with the ball portion to flexibly connect segments together to form a ball and socket-type joint. In another embodiment, the segment comprises a support member which has a threaded shaft portion and a ball surface portion. The threaded shaft portion is engageable with an inner threaded surface of a ring for rigidly coupling the support member to the ring. The ring in turn has an outer surface at one end which is threadably engageably with a hollow cylindrical sleeve. The other end of the sleeve is formed with a socket portion for engagement with a ball portion of the support member. In yet another embodiment, a secondary rod is slidably inserted in a hollow channel through the center of the segment to provide additional strength. A method for controlling a nuclear reactor utilizing the control rod assembly is also included.

5 Claims, 2 Drawing Sheets

HIGH TEMPERATURE CONTROL ROD ASSEMBLY

FIELD OF THE INVENTION

The U.S. Government has a paid-up license in this invention and the right in limited circumstances to require the patent owner to license others on reasonable terms as provided for by the terms of Contract No. DE-AC03-88F17367 awarded by the Department of Energy.

This invention relates generally to a control rod assembly for use in a nuclear reactor. More specifically, the invention relates to a high temperature gas cooled nuclear reactor control rod assembly which can withstand the extremely high temperatures of a conduction cooldown event without damage. The present invention is particularly, though not exclusively, useful for allowing the inner control rods to be safely exposed to the hottest portion of the reactor core during such extreme temperature events.

BACKGROUND OF THE INVENTION

Advances in science and engineering in the past half-century have led to the widespread use of nuclear power to provide a significant portion of the world's energy needs. Commercial nuclear reactors use the principle of nuclear fission to generate the energy that is eventually converted to electricity, usually by steam cycles which incorporate turbine generators. Nuclear fission is a process in which the nuclei of isotopes of certain heavy elements, such as uranium or plutonium, are bombarded with free neutrons. Upon absorption of the free neutrons, the nuclei of the isotopes will, under certain conditions, split, or "fission." There is a resulting release of energy, most of which is in the form of kinetic energy of fission products. This energy is eventually converted into electricity.

The general method of reactor control used in industry is to control the number of free neutrons available for the fission process in the core of the reactor. Such neutron population control may be achieved by several methods or combinations thereof. For example, some reactors are designed such that only neutrons of a specific energy level are capable of causing the nuclear fuel to fission. In these reactors it is often the case that as the fission rate increases, neutrons of the appropriate energy level "leak" out of the core at a faster rate. This decreases the number of fissions in the core. Thus, the number of useful neutrons available for fission decreases in proportion to the fission rate increase. This design feature provides a kind of negative feedback which tends to force the nuclear processes within the core toward stability and steady state.

Another method of neutron control is to intersperse, within the nuclear fuel, a neutron absorber, or "poison." A simple poison-loading concept might be to distribute spherical granules of poison throughout the core. Early in core life, when core reactivity may be highest, the effective surface area of the poison spheres is at a maximum, exposing the greatest number of neutron-absorbing poison isotopes to the neutron flux. As the core ages, and both nuclear fuel and poison are depleted, the effective surface area of the poison spheres is reduced proportionately. This exposes fewer neutron-absorbing poison isotopes to the neutron flux and thereby compensates for the depletion of fuel and corresponding reduction in core reactivity.

A third and widespread method of neutron population control is incorporation of "control rods" into reactor design. Control rods are movable assemblies that contain neutron-absorbing isotopes. Because reactor cores are generally designed so that small movements of the control rods by the reactor operator can cause significant and immediate changes in core reactivity, this method is incorporated in most reactors as a primary means for human-interactive reactor control.

The effectiveness of control rods depends upon direct insertion of the rods into the reactor core. Thus, the structural elements of the rods themselves must be capable of providing support while being subjected to the extremely high temperatures of the core interior. In addition, many reactor designs require some control rod flexibility. This is so because the channels into which the control rods are inserted are long and extend from structures high above the core, down through the head of the pressure vessel which houses the core, and into the core itself. Design requirements also often require these long channels to be constructed with very little excess clearance between the rods and the channels. Problems then can arise when the normal settling and shifting inherent in any large structure causes relative misalignment in the control rod channels. Foundation shifting due to earth movement may also cause such channel misalignment Even though any such misalignment will likely be relatively minor, perhaps as small as a few microns, it may easily be enough to prevent the unimpeded movement of a rigid control rod within its channel.

Thus, the control rod structure must be flexible to ensure effective reciprocation within a potentially misaligned channel It must also be capable of providing sufficient strength for support over a wide range of extreme temperatures. One way to achieve such flexibility is to construct the control rods as a series of interconnected segments which are flexible at their respective joints.

Conventional flexible rod designs are composed of materials that provide strength which is adequate throughout much, but not all, of the temperature range of the core interior. For example, many control rod materials are incapable of withstanding the intense temperatures at the core interior generated during a conduction cooldown event in a high temperature gas-cooled reactor design, which may be as high as 2500° F. This necessitates removing or "locking out" interior rods during reactor operation as a precautionary measure. As a result, these rods cannot be used during reactor operation, and cannot be considered as components of "reactor safety equipment". This requires the added expense of modified reactor design and additional systems that can fulfill federally promulgated reactor safety guidelines.

Newer artificial graphites and composite materials, such as graphite or carbon-carbon, can withstand the intense temperatures at the core interior during conduction cooldown events. Conventional structures made of these composite materials, however, are structurally weaker at segment joint connections and, hence, are unsuitable for use as strength members.

It is therefore an object of the present invention to provide for unimpeded insertion of control rods into potentially misaligned control rod channels. It is a further object of the present invention to provide for control rod operation across the entire nuclear core in extreme temperature ranges, such as those found in certain gas-cooled reactors during conduction cooldown events. It is a further object of the present invention to provide a control rod assembly which is durable, reliable, and cost-effective in its manufacture and use.

SUMMARY OF THE INVENTION

A preferred embodiment of the high temperature nuclear control rod assembly comprises a plurality of cylindrical segments which contain neutron-absorbing material. The segments are preferably made of graphite, but can also be carbon-carbon composite or high temperature metallic alloys. The segments are movably connected together sequentially by ball joints. Each cylindrical segment has a first end which includes a ball portion, and a second end which has a socket portion. The ball portion at the first end of one segment engages a corresponding socket portion of the preceding segment, and the socket portion at the second end engages a corresponding ball portion of the succeeding segment.

Each segment has a cylindrical support post which is fastened axially within a hollow cylindrical sleeve. The hollow sleeve has an opening at one end for receiving neutron-absorbing material. At the other end of the sleeve there is a threaded sleeve bore and a threaded outer surface. The cylindrical support post has a threaded shaft at one end which is threaded into the threaded sleeve bore to securely fasten the support post axially within the sleeve. At the other end of the support post there is a ball surface portion. A hollow cylindrical collar which has an inner threaded surface engages the outer threaded surface of the sleeve for rigidly coupling the collar to the sleeve. The collar has an inner lip portion about its lower perimeter forming a hollow socket into which the ball portion fits. The plurality of segments are sequentially joined together, with the ball portion of the support post being movably supported by the socket lip portion of the collar on the preceding segment. The neutron-absorbing material is boronated graphite which may be boron carbide pellets which are either dispersed in the sleeve or formed in ring compacts stacked in the sleeve.

In another embodiment of the segment, a hollow channel is formed axially through the support post. An auxiliary support rod made of carbon-carbon composite is inserted in the hollow channel to provide additional support. A support stop is also mounted on the support rod.

In yet another embodiment of the present invention, the segment comprises a hollow cylindrical sleeve, which has a socket portion at one end. The other end of the sleeve has a threaded bore, and an opening into which the neutron-absorbing material is inserted. There is also a hollow cylindrical collar which has an outer threaded surface for engagement with the threaded bore of the sleeve for rigidly coupling the collar to the sleeve. The collar also has an inner threaded bore. A support member has a threaded shaft portion which is engageable with the inner threaded bore of the collar to rigidly couple the support member to the collar. The support member also has a ball surface portion which fits into the socket portion of the hollow sleeve of the next succeeding segment to form a ball joint. This permits a plurality of segments to be flexibly joined together and suspended in a control rod channel.

The novel features of this invention, as well as the invention itself, both as to its structure and its operation, will be best understood from the accompanying drawings, taken in conjunction with the accompanying description, in which similar reference characters refer to similar parts, and in which:

DESCRIPTION OF THE PREFERRED EMBODIMENTS

Figure 1:
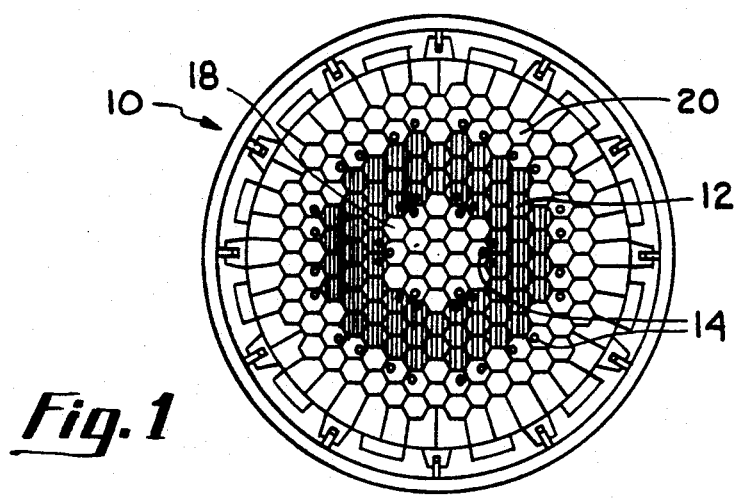
FIG. 1 is a diagrammatic top view of a reactor core showing locations of control rod assemblies for use in the intended environment according to the present invention.
Figure 2:
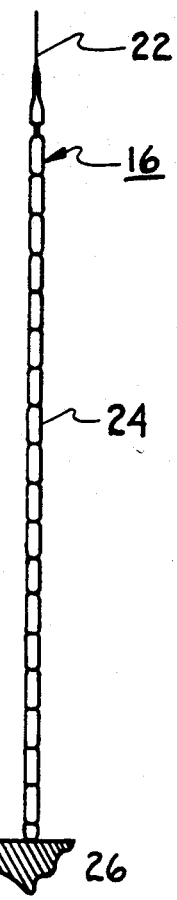
FIG. 2 is a side view of a high temperature nuclear control rod assembly in accordance with the present invention.

Referring now to FIGS. 1 and 2, FIG. 1 shows a reactor vessel 10 having an annular core 12. Vessel 10 also has a plurality of control rod assembly channels 14 which are vertically aligned to receive a high temperature nuclear control rod assembly 16, such as the one shown in FIG. 2. In the embodiment shown, vessel 10 has six (6) inner control rod channels 14 located in a control reflector portion 18 of vessel 10, and twenty-four (24) outer control rod channels 14 located in side reflector portion 20 of vessel 10. Channels 14 are arranged symmetrically about core 12. Control rod assemblies 16 may be slidably inserted into channels 14 surrounding the active core 12. Control rod assembly 16 is suspended in each of channels 14 by a cable 22 attached to a control rod drive (not shown) for raising and lowering control rod assembly 16.

Each control rod assembly 16 comprises a plurality of individual segments 24 which are flexibly connected together in succession as more fully explained below. In the embodiment shown in FIG. 2, there are eighteen (18) segments 24 joined together and suspended in vertical fashion. At the bottom of control rod assembly 16 is a shock impactor 26. Shock impactor 26 abuts bottom 78 of channel 14 of reactor vessel 10 when the control rod assembly 16 is fully inserted into control rod channel 14.

Each control rod assembly 16 is constructed of graphite or carbon-carbon composite materials. Graphite and carbon-carbon composite materials are capable of sustaining temperatures up to 2000° C. (3632° F.) without losing their strength properties. Such materials are also resistant to irradiation-induced dimensional changes that would cause bowing. They are further resistant to other irradiation-induced property changes, as well as to corrosion. The control rod assembly 16 of the present invention is constructed to provide sufficient strength and flexibility, which strength cannot be realized at extreme temperatures by utilizing known carbon-steel or nickel-based material control rod assembly structures. The construction and flexible connection of segments 24 is shown in further detail with reference to FIG. 3.

Figure 3:
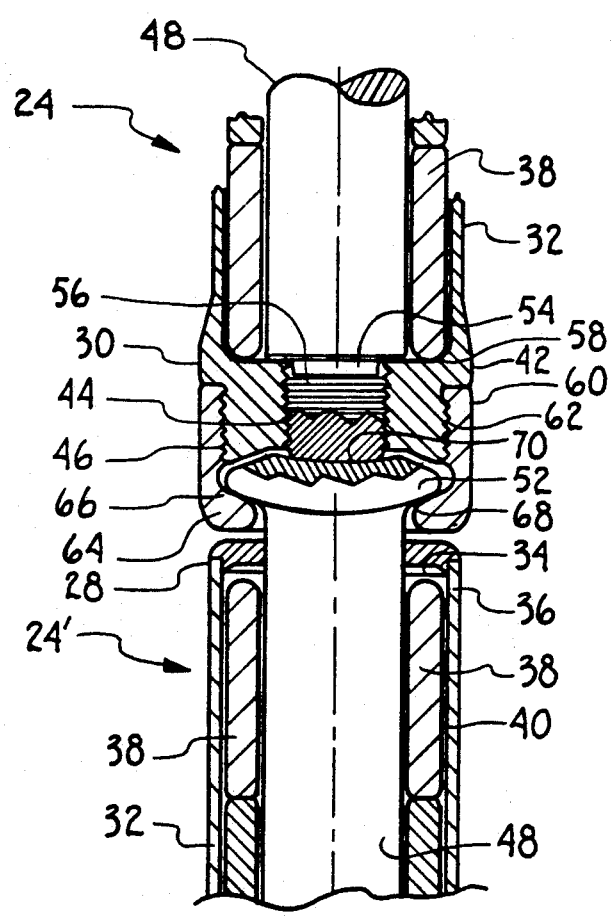
FIG. 3 is a side view, partly in cross section, of a portion of the control rod assembly showing two segments flexibly joined together by one embodiment of a ball joint in accordance with the present invention.

In FIG. 3, segment 24 will be described with reference to a pair of identical segments 24 and 24' which are flexibly joined together in succession. Segments 24 of FIG. 3 are preferably made completely of graphite, but various components can be constructed of carbon-carbon composite materials as described below. Each segment 24 has a first end 28 and a second end 30, with first end 28 of segment 24' being essentially identical to the first end (not shown) of joined segment 24. As earlier mentioned, each segment 24 comprises a hollow cylindrical sleeve 32 made of graphite or carbon-carbon composite. At the first end 36 of sleeve 32 there is an opening 34 to receive neutron-absorbing material 38. Neutron-absorbing material 38 is held in a chamber 40 of sleeve 32. At the second end 42 of sleeve 32 there is a threaded axial bore 44, and an outer threaded surface 46. A cylindrical support post 48 is disposed axially within hollow sleeve 32. Support post 48 has at one end 54 a threaded shaft 56 which is threadably engaged with sleeve bore 44 to fasten support post 48 rigidly within the hollow cylindrical sleeve 32. At the other end 50 of support post 48 is a ball portion 52. Support post 48 is also preferably made of graphite or carbon-carbon composite material which can withstand high temperatures, preferably being the same or similar material as that of sleeve 32. When support post 48 is fully threaded into sleeve 32, neutron-absorbing material 38 can be carried in chamber 40 which surrounds support post 48. Material 38 rests on the bottom shoulder 58 of sleeve 32. Neutron-absorbing material 38 may advantageously be in the form of boronated graphite pellets dispersed within chamber 40 of sleeve 32. Alternatively, it can be in the form of boronated graphite compacted into rings which are stacked within chamber 40 of sleeve 32. The boronated graphite is preferably boron carbide ($B_4C$) particles covered with a pyrolytic carbon coating to avoid hydrolysis from moisture that might be present during operation.

Threadably engaged on outer threaded surface 46 of second end 42 of sleeve 32 is a hollow cylindrical collar 60. Collar 60 is preferably made of the same high temperature graphite material as sleeve 32 and support post 48. Collar 60 has an inner threaded surface 62 for threadable engagement with outer threaded surface 46 of sleeve 32. Thus, collar 60 can be rigidly coupled to second end 42 of sleeve 32. Graphite cement may be used on the matching threads between post 48 and sleeve 32, and between sleeve 32 and collar 60, to provide additional holding capability.

Collar 60 further includes a socket portion 64 in the form of a ringed flange. Socket portion 64 has a socket lip portion 66. Socket lip portion 66 extends sufficiently inward to abut ball surface portion 68 of ball portion 52 of the next lower segment 24'. Ball surface portion 68 slidably engages socket lip portion 66 to thus essentially form a ball and socket-type joint between segments 24 and 24'. Thus, segment 24 supports next succeeding segment 24', and segments 24 and 24' are flexibly connected together sequentially to comprise suspended control rod assembly 16. There is also sufficient clearance 70 between the end of ball portion 52 and the end of shaft 56 to allow unimpeded movement for proper flexibility of control rod assembly 16. In a preferred embodiment, sleeve 32 has a diameter of approximately four (4) inches, and a length being that of standard fuel elements, approximately thirty-two (32) inches.

Cable 22, driven by a control rod driving mechanism, raises and lowers each control rod assembly 16 in channels 14 of reactor vessel 10 to movably locate neutron-absorbing material 38 or "poison" to predetermined positions about core 12 during reactor operation. Due to the high temperature capability of control rod assembly 16 of the present invention, control rod assembly 16 may be utilized in the inner channels 14 of central portion 18 of vessel 10 as shown in FIG. 1. There is no need to lock them out of vessel 10 as with conventional control rod structures, since the control rod assembly 16 of the present invention is able to withstand extreme temperatures which can occur, such as during a conduction cooldown event.

Figure 4:
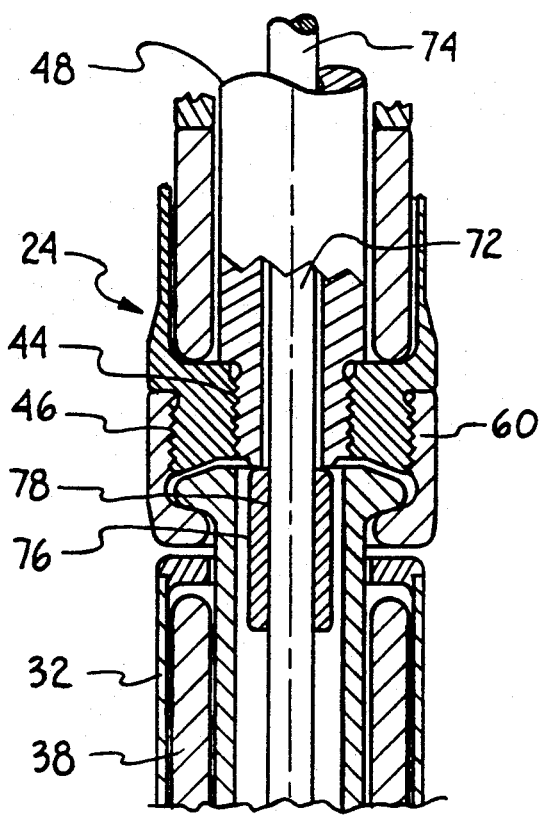
FIG. 4 is a side view, partly in cross section, of a portion of the control rod assembly showing two segments flexibly joined together by another embodiment of a ball joint in accordance with the present invention.

Another preferred embodiment of the present invention is shown in FIG. 4. It is similar to that described in FIG. 3, except that support post 48 further includes a central axial orifice 72. A secondary support rod 74 is inserted through orifice 72 to provide additional strength for support post 48. Support rod 74 may be made of carbon-carbon composite, or a high temperature metal such as alloy 800H. Secondary support rod 74 is held in place within central orifice 72 by a stop 76, which prevents secondary support rod 74 from being dislodged from the central orifice 72. Stop 76 is held in place by graphite cement between stop 76 and rod 74. In the unlikely event that one of sleeves 32 should become weakened and incapable of carrying the load, rod 74 can be utilized to lift and remove entire control rod assembly 16 from channel 14. Even if support rod 74 is made of a conventional metallic material, it is still useful. In a high temperature event, support rod 74 would remain in orifice 72 in an unloaded state. During such high temperature event, control rod assembly 16 would be bottomed-out in channel 14, sitting on shock impactors 26 on bottom 78 in control rod channel 14. After the event is over and temperatures have subsided, support rod 74 cools and regains its strength. It can then be used to retrieve control rod assembly 16 or it can be removed and replaced with new support rod 74. If support rod 74 is made of carbon-carbon composite material, then support rod 74 need not be in an unloaded state, and can be used to additionally support the load during the highest temperatures in such an event.

Figure 5:
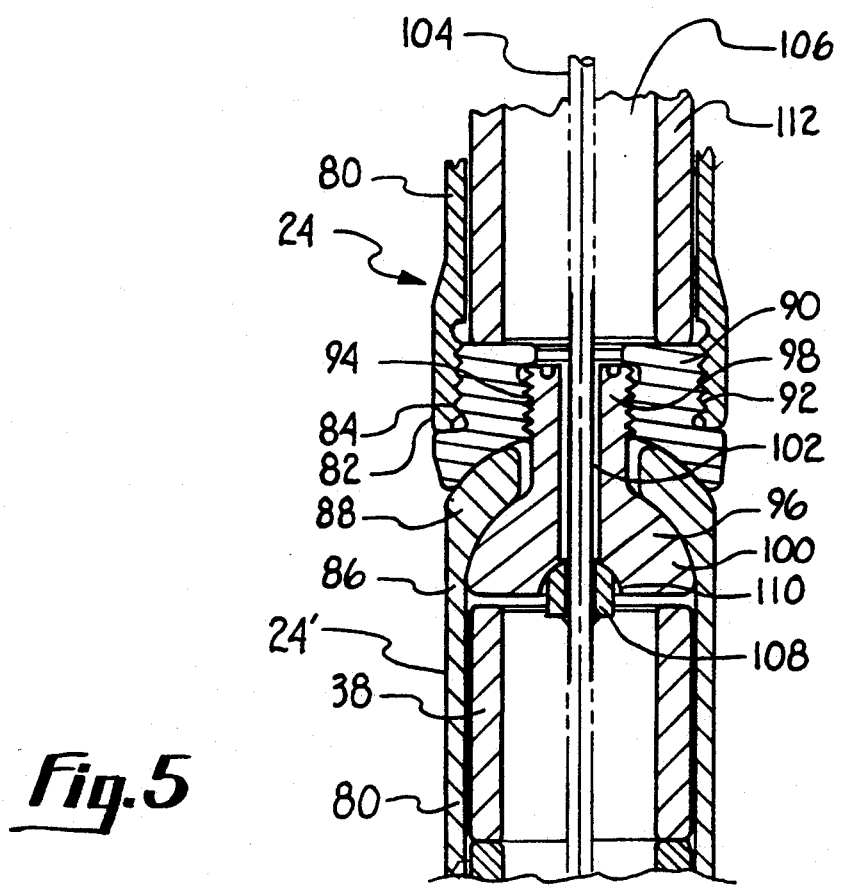
FIG. 5 is a side view partly in cross section of a portion of the control rod assembly showing two segments flexibly joined together by yet another embodiment of a ball joint in accordance with the present invention.

Yet another embodiment of the present invention is shown in FIG. 5. Identical segments 24, 24' each have a hollow cylindrical sleeve 80. One end 82 of sleeve 80 is open in order to receive neutron-absorbing material 38 as explained below End 82 also has a threaded surface 84. At the other end 86 of sleeve 80 there is a socket portion 88. End 82 of sleeve 80 is fastened on a threaded ring 90. Threaded ring 90 has an outer threaded surface 92 which threadably engages inner threaded surface 84 of sleeve 80. Ring 90 also has an inner threaded surface 94. Support member 96 has a threaded shaft portion 98 for engagement with inner threaded surface 94. At an end opposite threaded shaft portion 98 on support member 96 there is ball portion 100. Ball portion 100 is formed to movably fit into socket portion 88 to constitute a flexible ball joint connection between segment 24 and 24'. Segment 24 thus provides support for next succeeding segment 24' of suspended control rod assembly 16. An orifice 102 extends axially through the center of support member 96. Secondary support rod 104 is disposed axially through open space 106 inside hollow sleeve 80, and through orifice 102 of support member 96. A support stop fitting 108 is secured to secondary support rod 104, for abutment with surface 110 of ball portion 100. Neutron-absorbing material 38 is preferably contained in the form of compacted rings 112 stacked in hollow sleeve 80, leaving open space 106 which allows ample room for rod 104.

Thus, control rod assembly 16 is constructed of material able to withstand extreme temperatures. Moreover, the construction of the present invention provides necessary strength, as well as flexibility. Control rod assembly 16 can be inserted and removed from inner channels 14 during extreme temperatures, such as those of conduction cooldown events, in a manner heretofore unknown. There is less damage to control rod assembly 16. Moreover, control rod assembly 16 is reusable after conduction cooldown events. This increases the safety factor of the reactor in the sense that additional reactor control is possible with existing core design. This also minimizes the cost of additional systems which might otherwise be required for safely operating reactors, which must lock out inner control rods during such events. The present invention also makes a reactor core more efficient by allowing positioning and distribution of neutron-absorbing material in the core for power shaping, when availability of the inner control rods is utilized in the design of such reactors.

While the particular high temperature nuclear control rod assembly as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as defined in the appended claims.

I claim:

1. A control rod assembly for use in nuclear reactor control, comprising:

a plurality of segments, each said segment being made of a graphite composite material, each said segment having a chamber for containing neutron-absorbing material, wherein said chamber comprises a hollow cylindrical sleeve having a first end formed with an opening for receiving said neutron-absorbing material, and having a second end formed with a sleeve bore and an outer sleeve surface;

a cylindrical weight-bearing support post positioned substantially centrally of said sleeve, said support post having a first end formed as a ball surface portion and a second end formed as a shaft, said shaft being engageable with said sleeve bore for rigidly coupling said support post axially within said hollow sleeve, said neutron-absorbing material being disposed in said chamber between said sleeve and said post, said first end of said support post extending through and beyond said opening of said hollow cylindrical sleeve; and a hollow cylindrical collar having a socket lip portion correspondingly shaped to receive said ball surface portion of an adjacent support post, and having an inner surface for engaging said outer sleeve surface on said second end of said sleeve to rigidly couple said collar to said sleeve.

2. A control rod assembly for use in nuclear reactor control as recited in claim 1, wherein said neutron-absorbing material is boronated graphite.

3. A flexible control rod assembly for use in nuclear reactor control comprising a plurality of substantially cylindrical graphite composite segments, said segments each having a hollow sleeve member for containing neutron-absorbing material, said hollow sleeve member having a first end and a second end, said segments being flexibly joined sequentially in succession by: positioned substantially centrally within said hollow sleeve member, said support post a weight bearing support post having a ball on one end of said post and a shaft portion on an opposite end of said post, and wherein said sleeve member has an inner surface and an outer surface at said first end, said inner surface being engaged with said shaft for securing said shaft to said sleeve said one end of said support post extending through and beyond said second end of said hollow sleeve member; and a ball support member engaged with said outer surface, said ball support member formed with an opening and an inwardly protruding flange on the circumference of said opening for cooperating with and engaging said ball associated with an adjacent said support shaft; said neutron-absorbing material being disposed in the space between said hollow sleeve member and said support post.

4. A control rod assembly for use in nuclear reactor control as recited in claim 3, wherein said neutron-absorbing material is boronated graphite pellets dispersed within each said sleeve.

5. A control rod assembly for use in nuclear reactor control as recited in claim 3, wherein said neutron-absorbing material is boronated graphite formed in ringed compacts contained in each said sleeve.

* * * * *